United States Patent [19]
Zitzelsberger

[11] 4,283,588
[45] Aug. 11, 1981

[54] AUTOMATIC GUIDANCE SYSTEM FOR RADIATION-RESPONSIVE SYSTEMS

[75] Inventor: Helmut Zitzelsberger, Munich, Fed. Rep. of Germany

[73] Assignee: Siemens Aktiengesellschaft, Berlin & Munich, Fed. Rep. of Germany

[21] Appl. No.: 72,096

[22] Filed: Sep. 4, 1979

[30] Foreign Application Priority Data

Sep. 27, 1978 [DE] Fed. Rep. of Germany ....... 2842084

[51] Int. Cl.³ .............................................. H01L 31/00
[52] U.S. Cl. ...................................... 136/246; 126/425; 250/203 R; 353/3
[58] Field of Search ................... 136/89 PC; 126/422, 126/424, 425; 250/203 R; 353/3

[56] References Cited

U.S. PATENT DOCUMENTS

| | | | |
|---|---|---|---|
| 3,982,526 | 9/1976 | Barak | 126/425 |
| 4,044,752 | 8/1977 | Barak | 126/425 |
| 4,063,543 | 12/1977 | Hedger | 126/425 |
| 4,158,356 | 6/1979 | Wininger | 126/425 |

*Primary Examiner*—Aaron Weisstuch
*Attorney, Agent, or Firm*—Hill, Van Santen, Steadman, Chiara & Simpson

[57] ABSTRACT

The invention concerns a guidance, or tracking, arrangement which automatically adjusts the alignment of a radiation responsive system in accordance with the position of a movable radiation source. The arrangement utilizes two bodies able to transmit heat expansion forces into linear movements to rotate a rocker about an axis perpendicular to the path plane of the source. The bodies are partially shaded such that exposure to the radiation source controls the extent to which the bodies rotate the rocker. Resilient support means compensate the arrangement for undue forces arising from expansions of the bodies.

5 Claims, 2 Drawing Figures

AUTOMATIC GUIDANCE SYSTEM FOR RADIATION-RESPONSIVE SYSTEMS

BACKGROUND OF THE INVENTION

1. Field of the Invention

The invention relates to an automatic guidance arrangement for a system responsive to radiation when the heat radiation source is movable.

2. Description of the Prior Art

There are presently known many types of systems which function in response to radiation. For example, such systems have been employed to take measurements of or locate a heat radiation source, or to absorb or reflect heat radiation, or to effect shading against a radiation source. The degree to which the systems receive the radiation affects the performance and exercise of the systems' radiation-related functions. A critical factor in achieving efficient radiation reception is a system's angle of incidence to the radiation source.

The angle of incidence to a radiation source is an imaginary angle between a line emanating from the center of the radiation reception surface of a system and extending normal to the plane embodying the radiation reception surface and a line extending between the center of the radiation reception surface and the center of mass of the radiation source. Hence, a system at a low angle of incidence to a radiation source would directly face the radiation source. Lower angles of incidence permit more complete exposure to the radiation, since instances of shading are reduced.

One particular category of radiation systems for which performance is directly related to the angle of incidence to the radiation source is solar cells, which convert sunlight energy into electrical energy, such as a photovoltaic cell. In order to optimize their operations, many small-scale solar cell systems utilize guidance arrangements to bring the systems into positions of low angles of incidence with the sun. Known guidance arrangements for solar cell systems presently adjust solar cell carriers by means of electric or mechanical motors automatically actuated through the use of optical, electronic, or mechanical control systems. However, one of the disadvantages in these present arrangements is that they require the expenditure of externally produced energy for their operation and, sometimes, in order to maintain operation of their control parts. This need for external energy results in added costs and exposes the systems to the threat of possible shutdown in this era of the energy crisis.

Further shortcomings with the present guidance arrangements for solar cells systems are that they require expensive, sometimes bulky, apparatus and that they involve complicated machinery requiring relatively high maintenance.

The present invention affords an automatic guidance arrangement for radiation-responsive systems, such as solar cells, which avoids the disadvantages, inefficiencies, shortcomings, and problems inherent in prior arrangements. The present invention utilizes simplified structure, requiring minimal maintenance, and operates without requiring the expenditure of externally produced energy.

SUMMARY OF THE INVENTION

The present invention is an automatic guidance arrangement by which a radiation-responsive system, such as an array of solar cells, is aligned with the position of a movable radiation source, such as the sun, so that the system's exposure to radiation is maintained at low angles of incidence. The inventive arrangement utilizes thermal expansion due to the heat of radiation from the source to propel the system into proper orientation to the source. The invention is further arranged so that undue forces do not build up and expansion effects due to changes in air temperature do not interfere with the guidance, or tracking, operation.

In accordance with the invention, the guidance arrangement utilizes two bodies having means able to transmit forces due to thermal expansion occurring within each of the bodies into linear, longitudinal movements and a rocker rotatable about an axis running perpendicular to the path plane of a movable radiation source. The bodies are positioned in a spaced-apart and parallel fashion on either side of a vertical plane containing the rotation axis such that their linear movements at one end serve to tilt the rocker about its rotation axis. The bodies are supported at their other end upon a platform means made linearly movable in a direction perpendicular to the axis of rotation of the rocker in response to the linear movements of said bodies. The expansion bodies are partially shaded from exposure to radiation from the source in such a way that exposure to the radiation source controls the extent to which the bodies rotate the rocker.

The shade formed over the expansion body furthest from the emergence point of the movable radiation source permits only that side of the body facing the emergence portion of the source's path to be open. The shade formed over the expansion body furthest from the departure point of the movable radiation source permits only that side of the body facing the departure portion of the source's path to be open. The open or exposed sides of the bodies substantially face one another; however, the open sides can, in a practical manner, lie at an angle to one another of approximately 15°. In this manner, the expansion bodies cannot shade one another and thus exclude the influence of the radiation source during certain positions along its path.

When the source is at its extreme positions, the body furthest from the source displaces the rocker about its axis of rotation towards the source; while the body closest to the source does not expand and serves as a tensile force against movement of the rocker. As the source moves away from its point of emergence toward its point of departure, the exposed side of the expansion body which is turned toward the source is illuminated at increasingly oblique angles such that thermal expansion within the body decreases. Meanwhile, radiation energy from the source begins to reach the exposed side of the other body such that this body acts to propel the rocker. The process, wherein the body heated first is increasingly shaded and the body shaded first is increasingly heated, continues until both expansion bodies are irradiated uniformly whereupon the radiation source is directly over the system and the rocker lies in a level position. Thereafter, the source begins along the departure portion of its path and the process continues until the opposite extreme position is reached. In this manner, the rocker position is automatically adjusted without the expenditure of externally produced energy.

Linear resiliency of the support platform serves to accommodate linear movements by the expansion bodies when the rocker is at an extreme position about the rotational axis, thereby preventing destructive forces from occurring in the guidance arrangement. The platform's resiliency further serves to compensate the guidance arrangement for changes due to heat transfer other than radiation, such as conduction of air temperature. Because thermal expansion effects from air temperature occur identically to each of the bodies, linear movements arising from heat transfer from the air would balance out across the rotational axis of the rocker. The effect of such movements is instead relieved by translation of the platform.

The rotational action of the rocker serves to align the radiation-responsive system such that a low angle of incidence with the radiation source is attained. The rocker may act directly, by serving as the system carrier, or indirectly, by means of corresponding movement transmissions, such as through known gearing arrangements.

In the case of radiation sources movable along fixed, predetermined paths, such as the sun, the axis of rotation of the rocker would be fixed. However, it would also be readily possible for one skilled in the art to provide for adjustment of the rotation axis in accordance with path deviations or irregularities by means of control features from known guidance arrangements or further expansion bodies.

DESCRIPTION OF THE PREFERRED EMBODIMENT

The preferred embodiment is directed to an automatic guidance arrangement for a solar cell system. It will be understood, however, that the principles of the present invention would be applicable to other types of radiation-responsive systems. For example, the arrangement according to the invention could be utilized with any sun-oriented system, such as a solar heater or sun shield.

For the purposes of the preferred embodiment, the rocker functions as the system carrier. This form of arrangement obviates the need for extraneous means to transmit rocker movements to the system carrier.

Figure 1:
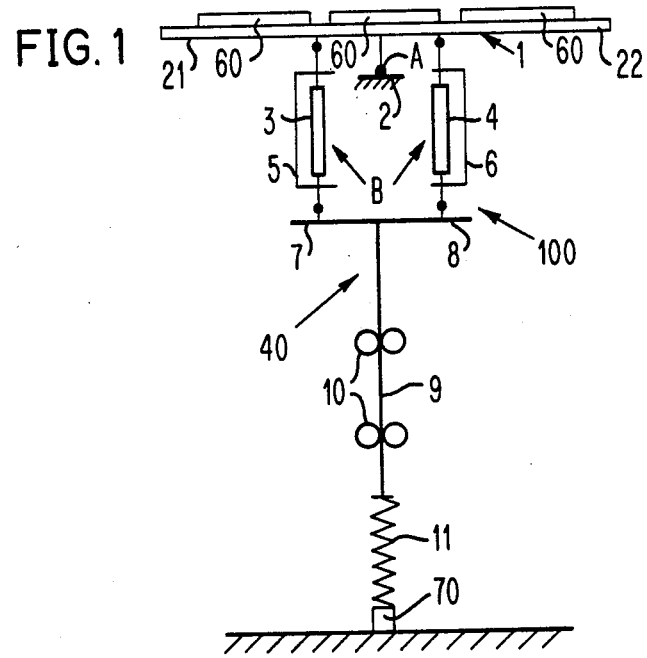
FIG. 1 is a schematic front side view of the present invention.

FIG. 1 schematically illustrates a guidance arrangement 100 of the present invention, wherein a planar rocker 1 is pivotally supported about a fulcrum 2. An array of solar cells 60, such as photovoltaic cells, is positioned, or carried, along the upper surface of the rocker 1. The cells 60 serve as a solar radiation-responsive system. The radiation source, the sun, is movable in a predetermined path beginning (sunrise) to the left of FIG. 1 and traveling in an arc over the system 100 until departing (sunset) to right of FIG. 1.

The rocker 1 pivots on the fulcrum 2 about an axis of rotation A. Known support means, such as a pivot joint, may be utilized to mount the rocker 1 in the fulcrum 2. The rotation axis A is positioned to run perpendicularly to the path plane formed by the travel arc of the sun, so that the rocker 1 may be adjustably tilted about the axis A to face the sun. In this manner, the solar system 100 can be maintained in alignment with the sun such that very low angles of incidence are effected and performance of the system 10 is optimized throughout the day.

Two heat expansion bodies B serve to adjustably rotate the rocker 1 about its axis of rotation A so as to maintain the desired alignment with the sun. The heat expansion bodies B essentially require material with a relatively high coefficient of thermal expansion. For example, nearly all liquids expand on heating. Persons of ordinary engineering skill will readily envision many forms which an expansion body B could take. Skilled workers will readily appreciate that the heat expansion bodies B could include a bi-metallic strip or a spring bellows filled with a volatile gas.

Although the invention is not limited to the details of the expansion body, one simple example of a suitable form the body B could take would be a piston-cylinder arrangement. Such an arrangement may comprise a cylinder containing opposed pistons having piston rods extending outward from the pistons through the top and bottom of the cylinder. The pistons are formed with sealing means, such as piston rings, and act in combination with the side walls of the cylinder to sealably contain a quantity of heat expansive liquid between the pistons. The cylinder may be made from material through which heat radiation would readily pass, such as glass, or be absorbed, such as aluminum. This simple form for an expansion body B would function in the following manner. When the temperature of the liquid rises, the liquid expands resulting in linear, longitudinal outward movement of the piston rods. When the liquid cools and contracts, forces acting inward move the piston rods linearly inward.

The heat expansion body B will be effected by all means of heat transfer, such as conduction and convection from the ambient air and heat radiation from the sun transmitted into or absorbed by the body B. As shown in FIG. 1, two expansion bodies 3 and 4 are positioned so as to be spaced-apart and in parallel and situated on either side of the vertical plane containing the rotation axis A. The bodies 3 and 4 extend between the lower surface of the rocker 1 and a platform support means 40. Body 3 is connected in a known manner, so as to be rotationally movable, such as pivot joint, at the outer ends of its linearly moving members along arm 21 of the rocker 1 and leg 7 of the platform means 40, which are closest to the point of emergence of the sun. Body 4 is connected so as to be rotationally movable in a similarly known manner at the outer ends of its linearly moving members along arm 22 of the rocker 1 and leg 8 of the platform 40, which are furthest from the point of emergence of the sun but closest to the sun's point of departure.

The two expansion bodies 3 and 4 are surrounded by hollow shades 5 and 6, respectively, which partially cover each of the bodies 3 and 4 such that only one side remains open. The shading means 5 and 6 serve to prevent heat radiation from the sun from engaging the expansion bodies 3 and 4 and, so, control the extent to which the bodies 3 and 4 rotate the rocker 1. The shades 5 and 6 are made with heat insulation material, such as wood, and may be mounted in a known manner against the bodies 3 and 4.

The shades 5 and 6 are formed so that the exposed sides of the expansion bodies 3 and 4 substantially face one another. The shades 5 and 6 may, however, be slightly twisted with respect to each other such that the open sides lie at an angle of approximately 15° to one another. This offset prevents the bodies from shading one another and, thereby, interfering with the controlled influence the sun's radiation is to exert on the bodies 3 and 4.

The platform means 40 is mounted so as to be resiliently movable in a vertical line perpendicular to the axis A. Legs 7 and 8 extend perpendicularly from the upper end of a vertically extending brace 9. For the purposes of the preferred embodiment, the brace 9 is supported for linearly resilient movement by means of upper and lower bearing guides 10 and a spring means 11 connecting the lower end of the brace 9 to a fixed ground support 70.

Figure 2:
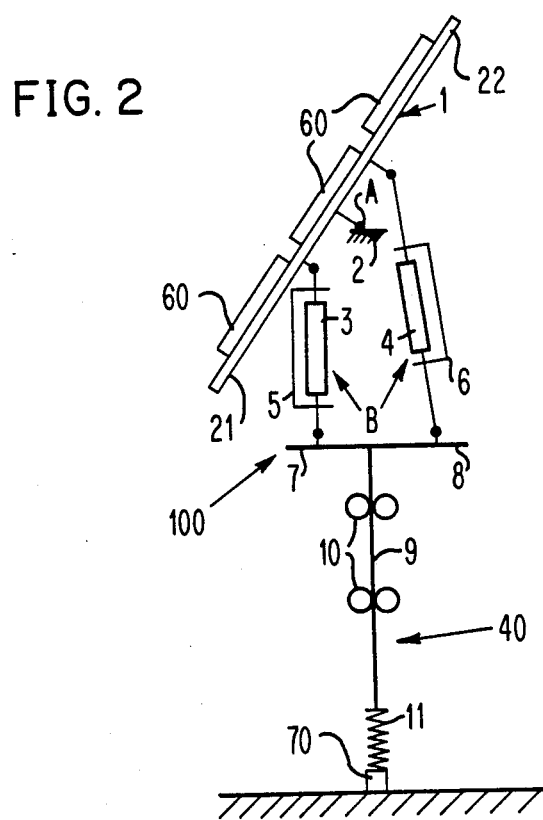
FIG. 2 is a schematic front side view of the present invention in an extreme position.

Operation of the guidance arrangement of the preferred embodiment is as follows. During the sun's emergence from the left of FIG. 1, the heat radiation from the sun will cause thermal expansion in the expansion body 4 since the only side exposed by the shade 6 faces the emergence position of the sun. The heat radiation will not influence thermal expansion in body 3 because shade 5 blocks radiation incidence from the emerging sun positions. Thermal expansion in body 4 is transmitted in the form of linear outward movements serving to propel the rocker 1 about its axis of rotation A, such that system 60 is brought into lower angles of incidence with the sun. A tensile force due to movement of the rocker 1 against the non-expanding body 3 counteracts with the expanding movement of the body 4 until finally the rocker 1 cannot be pivoted further as illustrated by FIG. 2. Should further outward movement by body 4 be possible when the rocker 1 reaches its extreme position on the fulcrum 2, the resilient platform means 40 can be moved vertically downward against the face of spring 11.

As the sun continues along its arc-shaped path, the exposed side of expansion body 4 is irradiated at increasingly oblique angles such that radiation heating is not as intense. The sun's rays begin to engage the expansion body 3, so that thermal expansion occurs therein. Linear outward movements transmitted from the body 3 serve to rotate the rocker 1 against the dissipating expansion forces of body 4.

When the sun stands directly over the guidance arrangement 100, both bodies 3 and 4 are equally exposed to the sun's radiation energy. The forces of expansion in the bodies 3 and 4 being equal, the rocker 1 lies level as shown in FIG. 1. Further thermal expansion in the bodies 3 and 4 is accommodated by linear movement of the platform means 40 against the spring force 11.

As the sun departs, body 4 is more and more shaded from the sun's rays by means 6. On the other hand, body 3 is increasingly exposed to the sun's energy. The increasingly greater thermal expansion in body 3 tips the rocker 1 about the axis A into positions where the system 60 faces the departing sun. When the sun departs and the rocker 1 is in the other extreme position directly opposite from that shown by FIG. 2.

With the disappearance of the heat source, thermal expansion in body 3 dissipates until the expansion forces in the bodies 3 and 4 are equal. The rocker 1 is then held level as shown in FIG. 1 until re-emergence of the sun and repeat of the tracking process.

Since the expansion bodies B are influenced by heat transfers other than sun radiation, resilient platform means 40 also serves to accommodate movements of the bodies B due to the other heat transfers, such as air temperature conduction, without affecting the position of the rocker 1. The pivoting movement of the rocker 1 correspondingly maintains the solar system 60 in positions of low angles of incidence with the sun throughout the day. The inventive guidance arrangement accomplishes its function without the need for complicated apparatus or the expenditure of externally produced energy.

Although various minor modifications may be suggested by those versed in the art, it should be noted that such modifications are to be embodied within the scope of the patent warranted hereon.

I claim as my invention:

1. Apparatus for the automatic alignment of a radiation responsive system according to the position of a movable radiation source comprising:
   (1) a rocker means carrying said radiation responsive system, said rocker means being rotatable about an axis which intersects with the plane of movement of said movable radiation source,
   (2) a platform means mounted for reciprocable translation in a direction perpendicular to said axis,
   (3) two heat expansion bodies positioned between said rocker and platform means for exposure to said radiation source, said bodies being mounted in spaced-apart fashion on opposed sides of said axis, each body having first and second end portions linearly, longitudinally movable in response to thermal expansion forces occurring within the heat expansion body,
   (4) means pivotally connecting respective first ends of said heat expansion bodies to said rocker means and respective second ends of said heat expansion bodies to said platform such that linear movements of said first and second ends serve to rotate said rocker means about said axis and translate said platform means, and
   (5) shade means for shading each body from exposure to said radiation source such that relative thermal expansion forces are formed in said bodies.

2. The apparatus according to claim 1, further comprising:
   means for resiliently suspending said platform means.

3. The apparatus according to claim 1, wherein said shade means partially enclose each said body such that uncovered sides of said bodies generally face one another.

4. The apparatus according to claim 3, wherein said shade means are formed such that said uncovered sides do not directly face one another.

5. The apparatus according to claim 1, wherein said radiation responsive system comprises an array of solar cells.

* * * * *